(12) United States Patent
Willis

(10) Patent No.: US 6,831,701 B2
(45) Date of Patent: Dec. 14, 2004

(54) OPTIMIZING DISPLAY OF PROGRESSIVE FRAME SIGNALS UP CONVERTED TO INTERLACED SIGNALS

(75) Inventor: Donald Henry Willis, Indianapolis, IN (US)

(73) Assignee: Thomson Licensing S.A., Boulogne (FR)

(*) Notice: Subject to any disclaimer, the term of this patent is extended or adjusted under 35 U.S.C. 154(b) by 322 days.

(21) Appl. No.: 09/893,116

(22) Filed: Jun. 27, 2001

(65) Prior Publication Data

US 2002/0063793 A1 May 30, 2002

Related U.S. Application Data

(60) Provisional application No. 60/250,271, filed on Nov. 30, 2000.

(51) Int. Cl.$^7$ .......................... H04N 7/01; H04N 11/20
(52) U.S. Cl. ...................... 348/446; 348/448; 348/458
(58) Field of Search ................................ 348/441, 446, 348/445, 448, 458, 459, 443, 554, 555, 556; H04N 7/01, 11/20

(56) References Cited

U.S. PATENT DOCUMENTS

| | | | | |
|---|---|---|---|---|
| 4,603,350 A | * | 7/1986 | Arbeiter et al. | 348/448 |
| 5,448,303 A | * | 9/1995 | Desor et al. | 348/618 |
| 6,144,412 A | * | 11/2000 | Hirano et al. | 348/441 |

* cited by examiner

*Primary Examiner*—Michael H. Lee
(74) *Attorney, Agent, or Firm*—Joseph S. Tripoli; Harvey D. Fried; Christine Johnson

(57) ABSTRACT

A method of optimizing the display of an up-converted interlaced video frame signal from a received progressive video frame signal (11) comprises the steps of receiving a progressive video frame signal, decoding (12) the progressive video frame signal using an interpolation function (18) to provide an interpolated interlaced video signal, deinterlacing (14) the interpolated interlaced video signal, and de-interpolating (16) the deinterlaced interpolated interlaced video signal to provide an optimized progressive video frame signal (17).

20 Claims, 3 Drawing Sheets

| Z-TRANSFORM UP CONVERSION ||
|---|---|
| 720p LINE | 1080i LINE |
|  | M = 11A + B |
| A |  |
|  | N = 8A + 8B |
| B |  |
|  | O = A + 11B + 4C |
|  | P = 4B + 11C + D |
| C |  |
|  | Q = 8C + 8D |
| D |  |
|  | R = C + 11D + 4E |
|  | S = 4D + 11E + F |
| E |  |
|  | T = 8E + 8F |
| F |  |
|  | U = E + 11F + 4G |
| G |  |
|  | ⋮ |
| ⋮ |  |

FIG. 2

| REVERSE (UNDO) UP CONVERSION BY ALGEBRAIC MATRIX |
|---|
| ⋮ |
| $C = \dfrac{47Q - 40R + 16S - 2T}{21}$ |
| $D = \dfrac{-5Q + 40R - 16S + 2T}{21}$ |
| $E = \dfrac{2Q - 16R + 40S - 5T}{21}$ |
| $F = \dfrac{-2Q + 16R - 40S + 47T}{21}$ |
| ⋮ |

FIG. 3

OPTIMIZING DISPLAY OF PROGRESSIVE FRAME SIGNALS UP CONVERTED TO INTERLACED SIGNALS

CROSS REFERENCE TO RELATED APPLICATIONS

This is a non-provisional application of provisional application Ser. No. 60/250,271 filed Nov. 30, 2000.

BACKGROUND OF THE INVENTION

1. Field of the Invention

This invention relates to the field of television receivers having processors for high definition video signals, for example MPEG 2 format signals, and in particular, to television receivers that convert between high definition video formats.

2. Description of Related Art

The following description uses certain abbreviations and designations related to video signal identification and/or video signal formats. These high definition formats have been defined by the ATSC. The term 720p refers to a video signal having 720 lines of video in each progressive (non-interlaced) frame. The term 1080i refers to a video signal having 1,080 interlaced horizontal lines in top and bottom fields, each field having 540 horizontal lines. In accordance with this convention, the term 720i would denote 720 lines of interlaced video per frame and the term 1080p would denote 1,080 lines of progressive horizontal lines in each frame.

In some situations an arriving 720p signal is to be ultimately displayed on a 720p display, but is first converted to 1080i for transmission to the display processor. The 1080i is first deinterlaced and is then passed through a reverse conversion calculation to reconstitute the original 720p signal with no additional vertical resolution loss or aliasing produced on non-moving scenes. Some high definition MPEG decoders will convert all incoming ATSC signals into 1080i format. This is not desirable for a 720p display.

If a 720p ATSC signal is received by a television receiver having a 720p display, such a signal can ordinarily be displayed optimally only in its original format. Unfortunately, some high-definition MPEG decoders are only designed to output a 1080i signal for HDTV, regardless of the format of the video source supplied to the MPEG decoder. Thus, a need exists for converting a received progressive signal from a decoded interlaced signal back to a progressive signal for optimal display.

BRIEF SUMMARY OF THE INVENTION

In a first aspect of the present invention, a method of optimizing the display of an up-converted interlaced video frame signal from a received progressive video frame signal comprises the steps of receiving a progressive video frame signal, decoding the progressive video frame signal using an interpolation function to provide an interpolated interlaced video signal, deinterlacing the interpolated interlaced video signal, and de-interpolating the deinterlaced interpolated interlaced video signal to provide an optimized progressive video frame signal.

In a second aspect of the present invention, a video receiver device optimized to enable the display of an upconverted interlaced video frame signal from a received progressive video frame signal comprises a video receiver and a video processor coupled to the video receiver, wherein the video processor comprises a high definition video decoder having an interpolator, a deinterlacer, and a reverse interpolator.

In a third aspect of the present invention, a video receiver device optimized to display an up-converted interlaced video frame signal from a received progressive video frame signal comprises a video receiver and a processor coupled to the video receiver. Preferably, the processor is programmed to receive the received progressive video frame signal, decode the received progressive video frame signal using an interpolation function to provide an interpolated interlaced video signal, deinterlace the interpolated interlaced video signal, and de-interpolate the deinterlaced interpolated interlaced video signal to provide an optimized progressive video frame signal.

BRIEF DESCRIPTION OF THE DRAWINGS

FIG. 2 is a chart illustrating a Z-Transform Up-Conversion table in accordance with the present invention.

FIG. 3 is a chart illustrating sample Reverse Up-Conversion by algebraic matrix in accordance with the present invention.

DETAILED DESCRIPTION OF THE PREFERRED EMBODIMENTS

Figure 1:
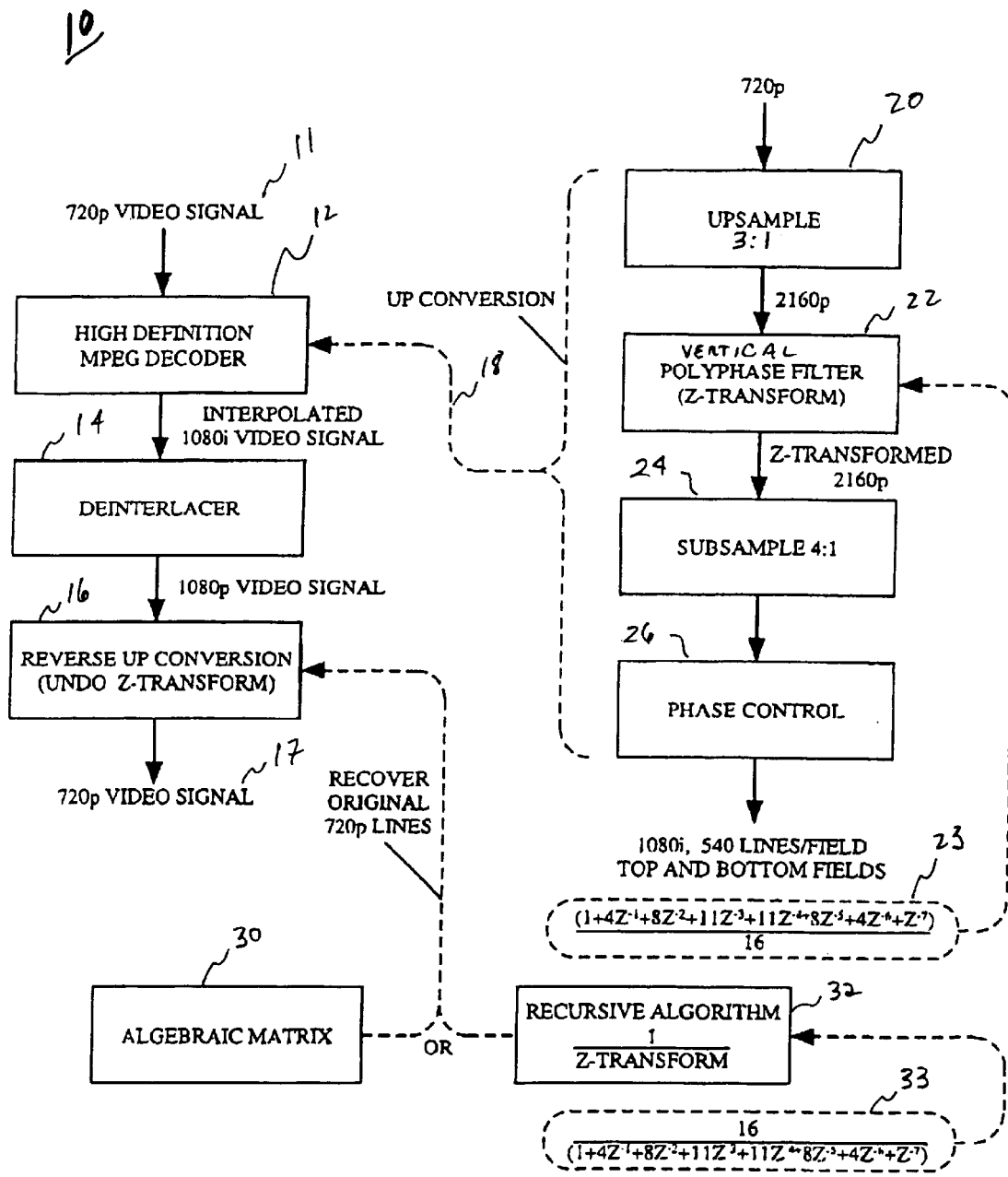
FIG. 1 is a flow chart illustrating a method of optimally displaying a received progressive video frame signal that has been up-converted to an interlaced video frame signal by using a reverse up-conversion in accordance with the present invention.

Referring to FIG. 1 and in accordance with the inventive arrangements, a method 10 is shown for optimally displaying a received progressive video frame signal 11 (such as a 720p signal) that has been up-converted to an interlaced video frame signal (such as 1080i signal) and preferably converted back into the original 720p signal format (17) as accurately as possible, at least on non-moving or film signals In accordance with the present invention, the 1080i signal is preferably converted back to 720p format which can be achieved in several ways. The best ways to convert back while preserving vertical resolution are those that generally begin with a deinterlacing operation after decoding. Thus, the method 10 preferably decodes a received progressive video frame signal 11 at block 12 preferably using a high definition MPEG decoder to provide an interpolated interlaced video frame signal (1080i). In this instance, it should be understood that the MPEG decoder preferably includes an interpolating interlacer circuit (not shown) to provide the interpolated interlaced video frame signal. Alternatively, the present invention could be embodied using a decoder that provides a decoded signal to a separate interpolating interlacer. Next, block 14 deinterlaces the interpolated interlaced video frame signal into a progressive video signal using a deinterlacer. Since this produces a 1080p signal, an additional conversion step such as the reverse up-conversion step shown in block 16 is needed.

The conventional method for converting the 1080p signal back to a 720p signal is to perform a vertical format conversion with an interpolator utilizing polyphase filter techniques. This second interpolation process is also the sort of process by which the 720p signal was originally converted to 1080i at block 12 in a first interpolation process. The conventional method or second interpolation process will degrade the vertical resolution and/or introduce new vertical aliasing artifacts into the picture. The up-conversion blocks in FIG. 1 identified by the dashed line brace 18 represent this conventional, theoretical construct. There are many ways in which this construct can be implemented, and it is not important which one of the many is actually used. However, it is important to know which one is used. To some extent, it may be that some implementations might be more suited to the inventive arrangements than others. In the presently preferred embodiment, the description of the inventive arrangements is made in the context of the operation of the DM1 ATSC module available from Thomson Consumer Electronics.

In accordance with the inventive arrangements, the conventional second interpolation from 1080 lines back to 720 lines is not performed. This is very advantageous because a second interpolation would further degrade the vertical resolution and/or introduce even more vertical aliasing artifacts. Instead of a second interpolation, an operation is performed to reverse or "undo" the first interpolation operation at block 16. This is possible because the nature of the first interpolation is known in every detail.

An example can be made from the processing of the Thomson DM1 ATSC module, which converts 720p to 1080i fields by use of a polyphase filter. With reference to the up conversion blocks in FIG. 1, this filter begins by upsampling the 720p three to one at block 20, to 2160p, by inserting two null lines (lines of zero values) after each successive 720p line. The resulting signal is then passed through a vertical filter at block 22 with the Z-transform function of:

$$(\tfrac{1}{16})(1+4Z^{-1}+8Z^{-2}+11Z^{-3}+11Z^{-4}+8Z^{-5}+4Z^{-6}+Z^{-7})$$

as shown in block 23. After this, the signal is vertically subsampled four to one at block 24 with a phasing which will produce a proper top field for a top field output, and with a different phasing during a bottom field to produce a proper bottom field output. Each output field will contain 540 lines, and two successive fields will contain 1,080 lines representing a 1,080 line raster. If there is no motion, these 1,080 lines can be considered to have come from the same picture.

The 1080i lines produced will be generated from the original 720p lines by the equations shown in FIG. 2. Letters from the first half of the alphabet (A through L) represent 720p lines and letters from the second half of the alphabet (M through Z) represent 1080p lines obtained from two successive fields of a non-moving interlaced picture. Each 1080p line will be understood to need to be divided by 16 to be normalized to the proper amplitude. Also note that the equations shown in FIG. 2 are derived from the Z-transform function described above. For example, the function for the letter "P" is derived from the coefficients for the second, fifth and eighth terms of the Z-transform function.

Now, undoing the foregoing operation means recovering the lines A, B, C, etc. from the lines M, N, O, etc., as indicated by the reverse up conversion block in FIG. 1. Alternative methods for recovering the 720p lines are utilization of a recursive algorithm as shown in block 32 and utilization of an algebraic matrix as shown in block 30.

The recursive algorithm is obtained by calculating the inverse (shown in block 33) of the Z-transform used in the up conversion. Such an inverse operation results in an infinite series of addition Z-terms. This method is calculation intensive and can be subject to stability problems during processing, but it can work.

A preferred approach is to recognize and take advantage of the fact that the equations used for generating lines N, O, P, and Q, for example, are each given in terms of the four lines A, B, C, and D, as shown in FIG. 2. Thus, four simultaneous equations having four unknowns can be solved using matrix algebra to get expressions for A, B, C, and D in terms of N, O, P, and Q. By performing these calculations for the whole raster it is possible to recover the original 720p signal by performing such algebraic calculations for the entire raster using the algebraic matrix represented by block 30. The reverse conversion equations for lines C, D, E, and F are shown in FIG. 3.

Of course, it should be understood that the exact recovery of the 720p signal will occur only during no motion. When motion occurs, the 1080p signal produced by the deinterlacer will, in general, contain less vertical resolution as represented by 540 field lines. However, unlike the second interpolation of the prior art, the algebraic equations are not expected to introduce additional artifacts.

It should also be noted that although the Z-transform has eight terms, it is not necessarily the case that an eight-tap filter is needed to generate the 1080i lines. The exemplary equations shown in FIG. 2 can be implemented by two-tap or three-tap filters and only two or three terms are required. Thus, a simplified tap-filter enables the use of simplified equations. This is, in part, a consequence of adding null lines in the upsampling step. This in turn simplifies the algebraic recovery of the original 720p lines, and is the basis for the earlier statement that certain up conversion techniques can be more appropriate than others for purposes of utilizing the inventive arrangements taught herein.

Figure 4:
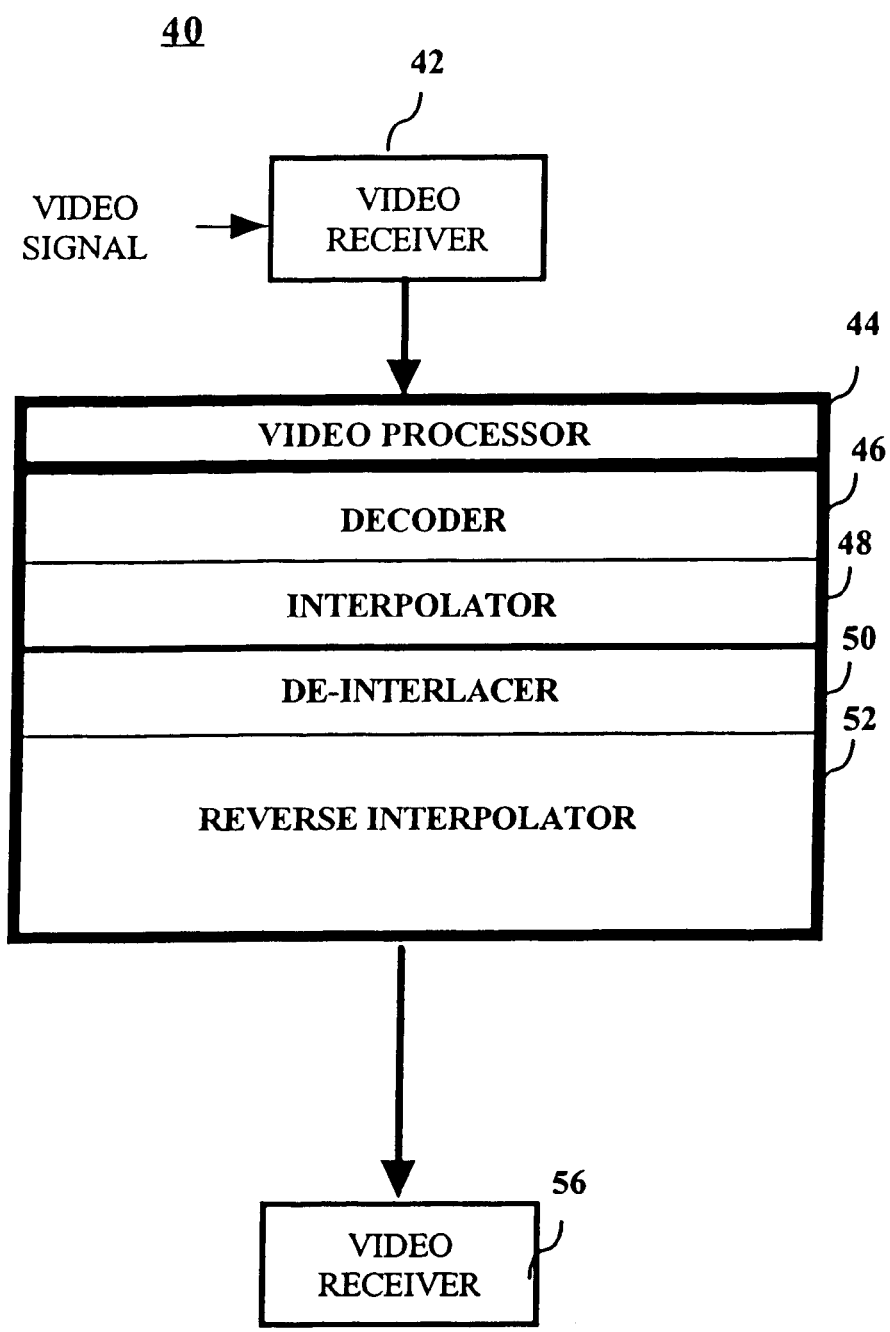
FIG. 4 is a block diagram illustrating a video receiver device in accordance with the present invention.

Referring to FIG. 4, a video receiver device 40 optimized to display an up-converted interlaced video frame signal from a received progressive video frame signal is shown in accordance with the present invention. Preferably, the video receiver device 40 comprises a video receiver 42 and a processor 44 such as a video processor coupled to the video receiver 42. Preferably, the processor is programmed to receive the received progressive video frame signal, decode the received progressive video frame signal using a decoder 46 and using an interpolation function or interpolator 48 to provide an interpolated interlaced video signal. Using a deinterlacer 50, the processor deinterlaces the interpolated interlaced video signal to provide a deinterlaced interpolated video signal. Using a de-interpolator or reverse interpolator 52, the deinterlaced interpolated video signal is de-interpolated (or reverse interpolated) to provide an optimized progressive video frame signal to a video display 56.

Although the present invention has been described in conjunction with the embodiments disclosed herein, it should be understood that the foregoing description is intended to illustrate and not limit the scope of the invention as defined by the claims.

What is claimed is:

1. A method of optimizing the display of an up-converted interlaced video frame signal from a received progressive video frame signal, comprising the steps of:
   receiving a progressive video frame signal;
   decoding the progressive video frame signal using an interpolation function to provide an interpolated interlaced video signal;
   deinterlacing the interpolated interlaced video signal; and
   de-interpolating the deinterlaced interpolated interlaced video signal to provide an optimized progressive video frame signal.

2. The method of claim 1, wherein the step of receiving comprises the step of receiving a video signal having 720 lines of video in each progressive (non-interlaced) frame.

3. The method of claim 1, wherein the step of decoding further comprises the step of providing an interpolated 1080 lines of interlaced horizontal lines in top and bottom fields, each field having 540 horizontal lines of video per field.

4. The method of claim 1, wherein the step of deinterlacing further comprises the step of providing a 1080 lines of progressive horizontal lines in each frame.

5. The method of claim 1, wherein the step of deinterpolating further comprises the step of providing an optimized progressive video frame signal in the form of a video signal having 720 lines of video in each progressive (non-interlaced) frame.

6. The method of claim 1, wherein the step of de-interpolating further comprises the step of undoing a Z-transform performed in the step of decoding.

7. The method of claim 1, wherein the step of de-interpolating further comprises the step of performing a reverse up conversion using an algebraic matrix.

8. The method of claim 1, wherein the step of de-interpolating further comprises the step of performing a recursive algorithm using an inverse Z-transform.

9. The method of claim 1, wherein the step of decoding further comprises using a simplified tap filter to interpolate and the step of reverse interpolation further comprises the step of performing a recursive algorithm using a simplified inverse Z-transform.

10. A video receiver device optimized to enable the display of an up-converted interlaced video frame signal from a received progressive video frame signal, comprising:
- a video receiver for receiving a progressive video frame signal;
- a video decoder coupled to the receiver for decoding received progressive video frames in accordance with an interpolation function and providing an interpolated interlaced video signal;
- a deinterlacer coupled to said decoder for deinterlacing the interlacing the interpolated interlaced video signal, and
- a de-interpolator coupled to said deinterlacer to provide an optimized progressive video frame signal.

11. The video receiver device of claim 10, wherein said video signal comprises 720 lines of video in each progressive (non-interlaced) frame, and wherein said video decoder provides an interpolated 1080 lines of interlaced horizontal lines in top and bottom fields, each field having 540 horizontal lines of video per field, the deinterlacer provides a 1080 lines of progressive horizontal lines in each frame, and the de-interpolator provides a video signal having 720 lines of video in each progressive (non-interlaced) frame.

12. The video receiver device of claim 10, wherein the video decoder uses a simplified tap filter and the de-interpolator performs a recursive algorithm using a simplified inverse Z-transform.

13. A video receiver device optimized to display an up-converted interlaced video frame signal from a received progressive video frame signal, comprising:
- a video receiver; and
- a processor coupled to the video receiver, programmed to:
  - receive the received progressive video frame signal;
  - decode the received progressive video frame signal using an interpolation function to provide an interpolated interlaced video signal;
  - deinterlace the interpolated interlaced video signal; and
  - de-interpolate the deinterlaced interpolated interlaced video signal to provide an optimized progressive video frame signal.

14. The video receiver device of claim 13, wherein the processor is further programmed to receive a video signal having 720 lines of video in each progressive (non-interlaced) frame.

15. The video receiver device of claim 13, wherein the interpolation function provides an interpolated 1080 lines of interlaced horizontal lines in top and bottom fields, each field having 540 horizontal lines of video per field and the processor is further programmed to providing a 1080 lines of progressive horizontal lines in each frame during the deinterlace step.

16. The video receiver device of claim 13, wherein the processor is further programmed during the de-interpolation step of providing an optimized progressive video frame signal in the form of a video signal having 720 lines of video in each progressive (non-interlaced) frame.

17. The video receiver device of claim 13, wherein the processor is further programmed during the de-interpolation step to perform the step of undoing a Z-transform performed in the decode step.

18. The video receiver device of claim 13, wherein the processor is further programmed during the de-interpolation step to perform a reverse up conversion using an algebraic matrix.

19. The video receiver device of claim 13, wherein the processor is further programmed during the de-interpolation step to perform a recursive algorithm using an inverse Z-transform.

20. The video receiver device of claim 13, wherein the video receiver device uses a simplified tap filter and a reverse interpolator performs a recursive algorithm using a simplified inverse Z-transform.

* * * * *